D. P. UPSON.
ROTARY STEAM ENGINE.
APPLICATION FILED MAY 29, 1911.
1,022,571.
Patented Apr. 9, 1912.
5 SHEETS—SHEET 3.
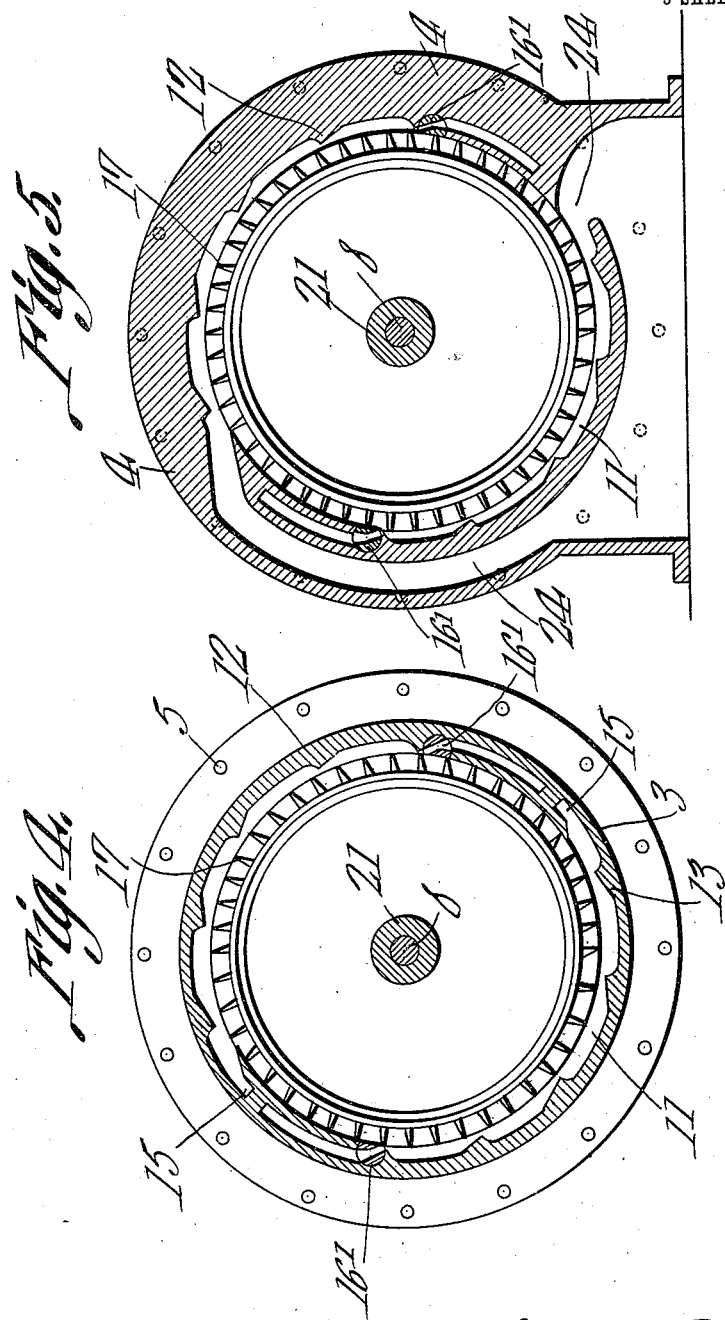
Witnesses
Delevan P. Upson,
Inventor
by C. A. Snow & Co.
Attorneys

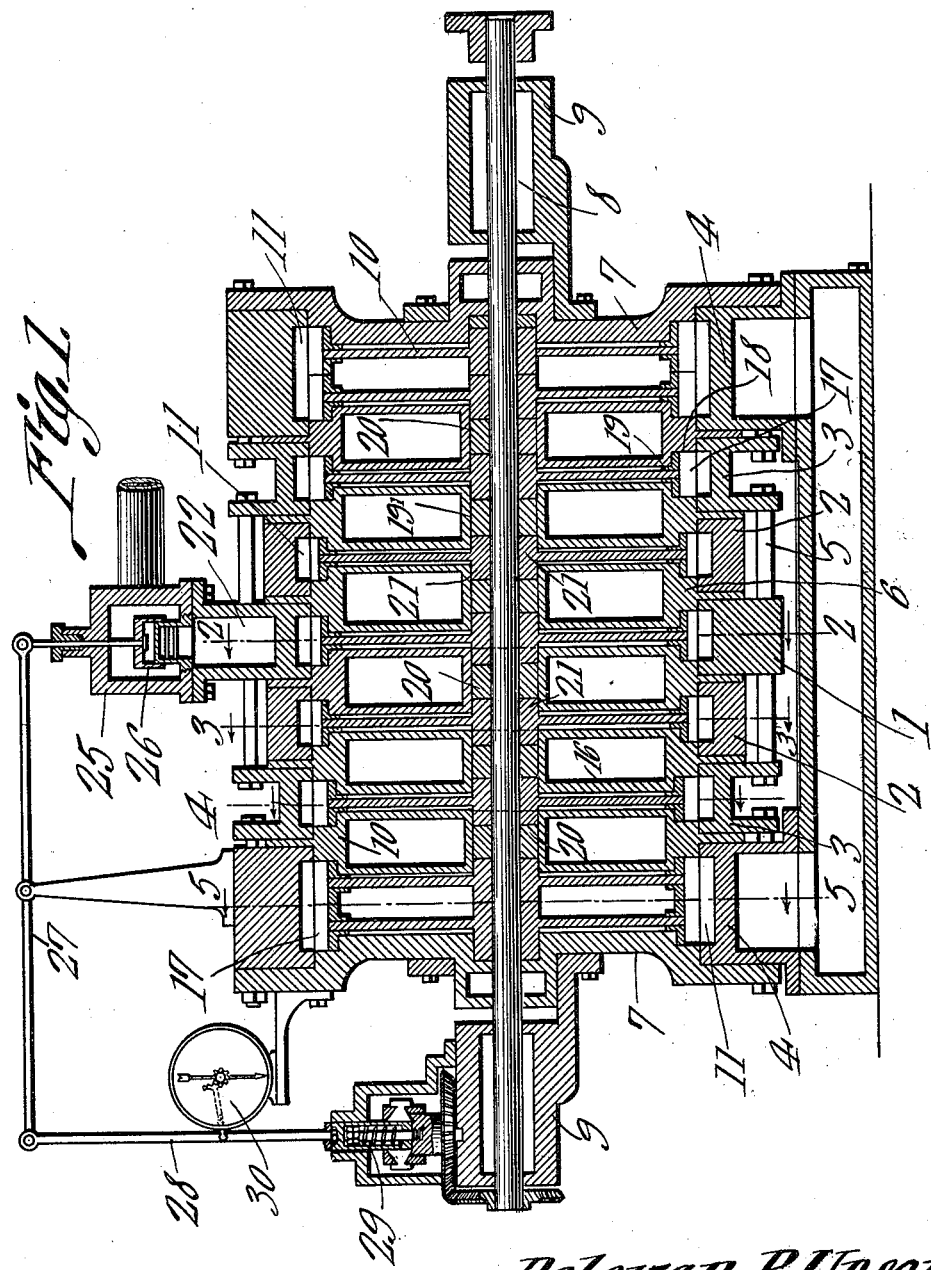

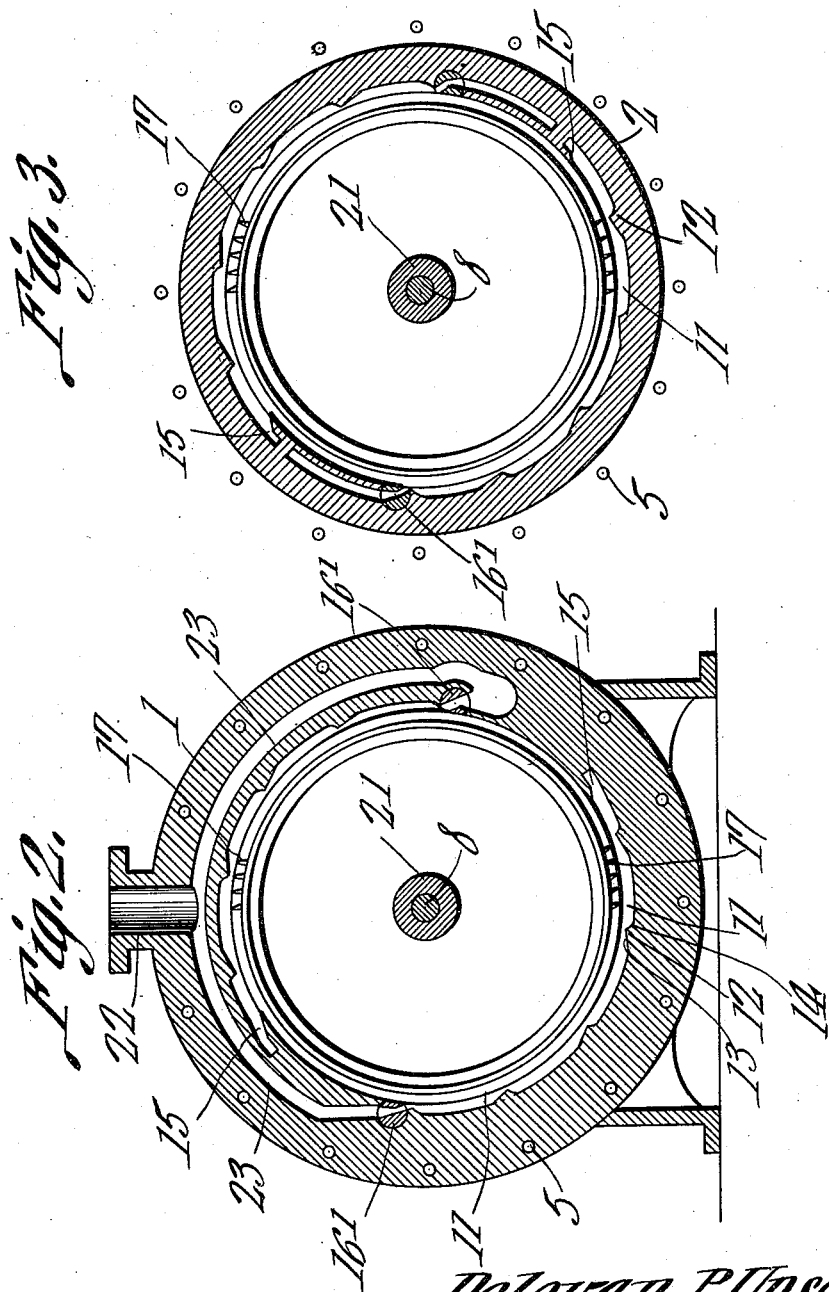

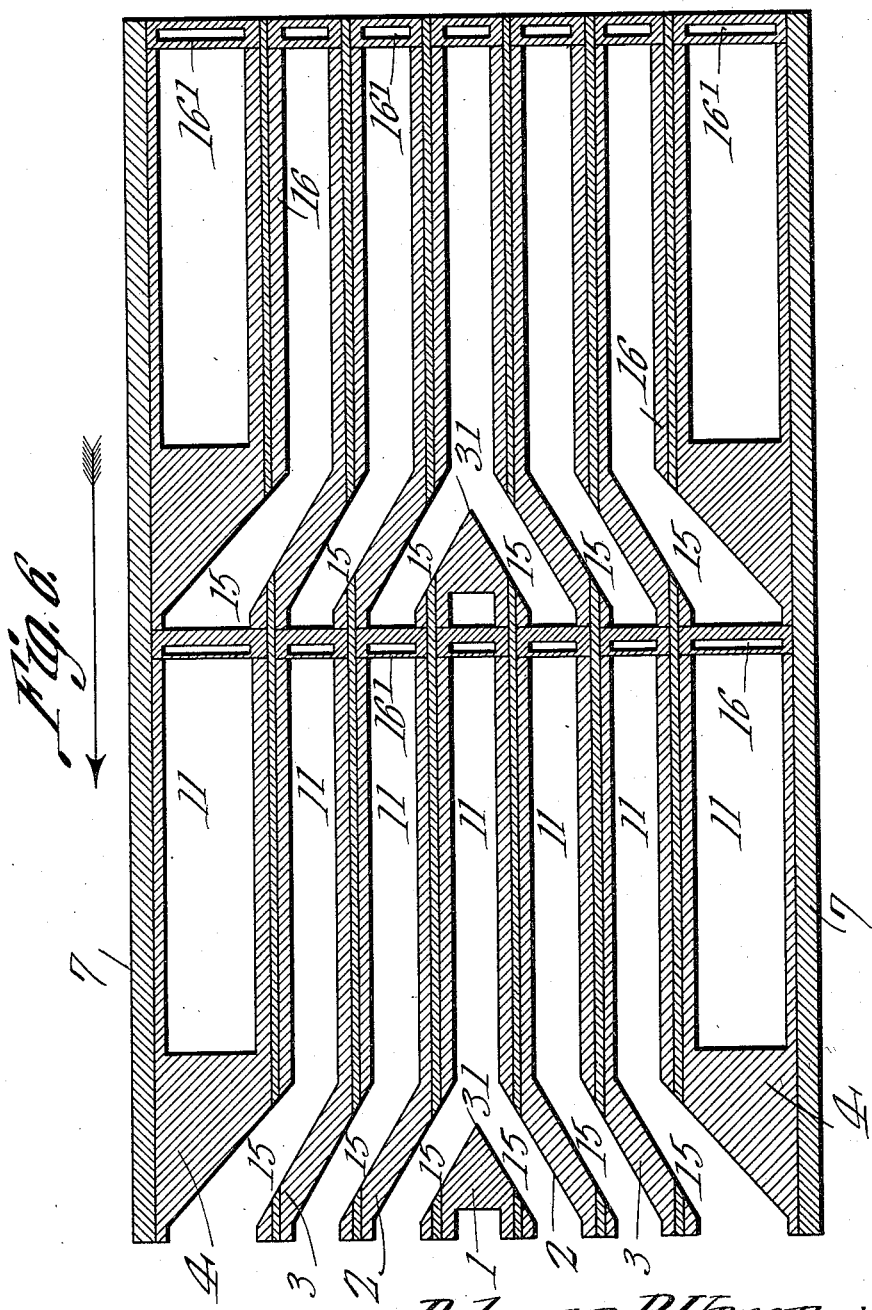

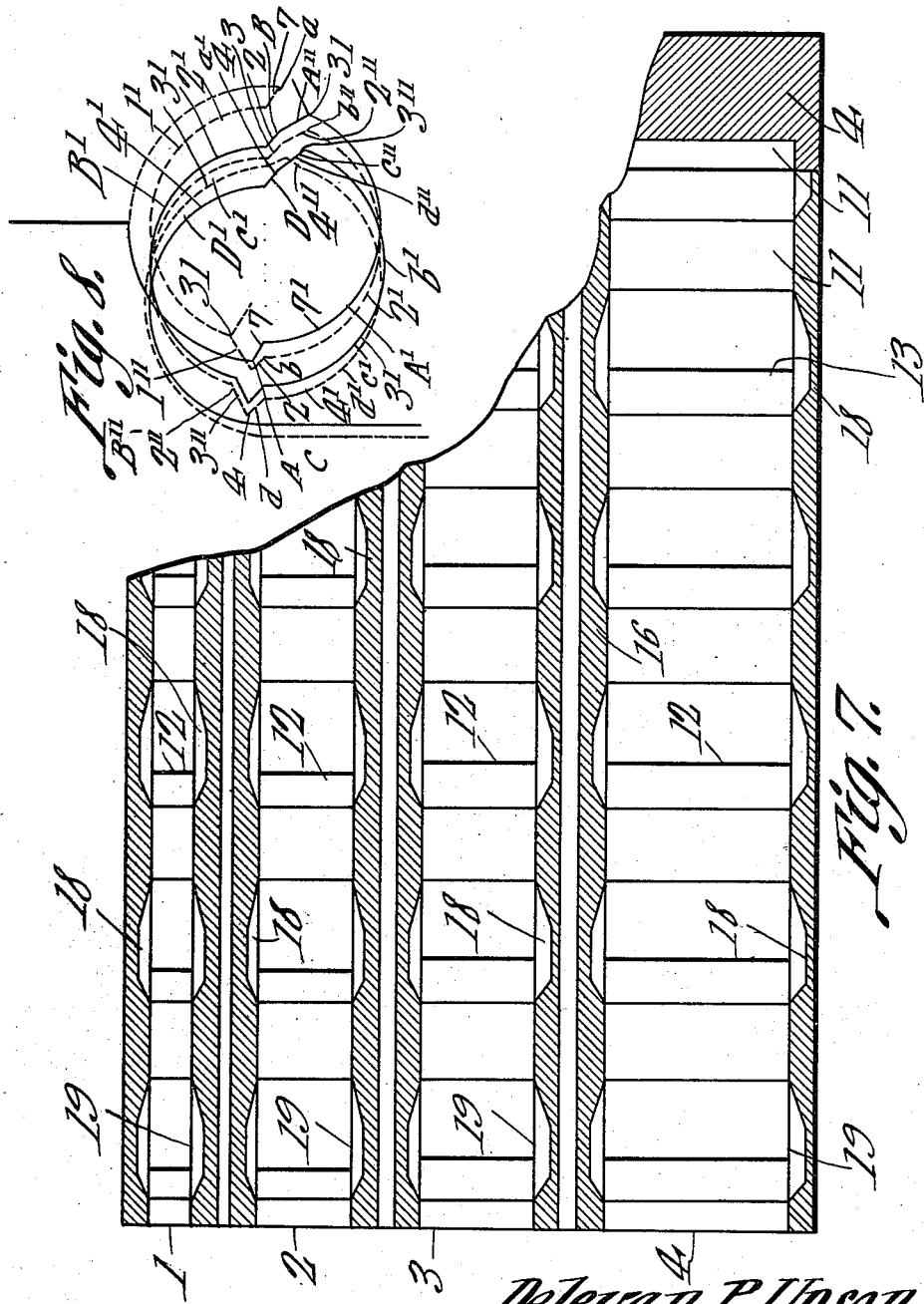

UNITED STATES PATENT OFFICE.

DELEVAN P. UPSON, OF JACKSONVILLE, FLORIDA, ASSIGNOR TO UPSON ROTARY MOTOR CO., OF JACKSONVILLE, FLORIDA.

ROTARY STEAM-ENGINE.

1,022,571.  Specification of Letters Patent.  Patented Apr. 9, 1912.

Application filed May 29, 1911. Serial No. 630,217.

*To all whom it may concern:*

Be it known that I, DELEVAN P. UPSON, a citizen of the United States, residing at Jacksonville, in the county of Duval and State of Florida, have invented a new and useful Rotary Steam-Engine, of which the following is a specification.

This invention has relation to rotary steam engines and consists in the novel construction and arrangement of its parts as hereinafter described and claimed.

The object of the invention is to provide an engine of the type stated in which the force of impact and expansion of a column or of columns of steam are utilized to advantage resulting in a saving of the steam by avoiding unnecessary waste. This is effected by admitting the steam to the engine preferably in two columns and by slitting each column into branches prior to introducing the same to the rotor of the engine. The branches of each column are directed against the members of the rotor at diametrically opposite sides thereof and in opposite directions and the branches of each column travel through the engine cylinder from a point midway between the ends thereof toward the ends, the branches of each column moving in opposite directions with relation to each other. By this arrangement the steam is at its highest or greatest pressure when working midway between the ends of the engine and gradually reduces in pressure as it works toward the ends of the engine. The travel and work of the steam from the middle of the engine to its ends is by stages and each stage includes a period of presentation, a period of work, and a period of transmission.

Structurally the engine consists of a cylinder made up of a series of rings provided with steam channels with partition members secured at their edge portions between the rings and which divide the cylinder into a succession of compartments. The steam channels of one ring are connected with the steam channels of the adjacent rings by means of transmission ports provided in the said rings and through the edge portions of the partition members and from the middle of the cylinder toward the ends thereof the steam channels of the succeeding rings gradually increase in transverse sectional area. The ends of the cylinder are closed by suitable heads and the said partition members are centrally bored and are provided in the said bores with fixed bushings of comparatively soft metal. A shaft passes through the heads of the cylinder and is journaled in suitable bearings the intermediate portion of the said shaft being journaled in said bushings. Disks are fixed at intervals to the said shaft and are located in the compartments between the partition members in the cylinder. Vanes are mounted upon the peripheries of the disks and have their outer end portions disposed toward the steam channels in the said rings. The steam courses are provided at their points where the steam is presented to the vanes and at the ends of their transmission portions with reducing nozzles having their discharge outlets tangentially disposed with relation to the peripheries of the disks. The steam channels in the rings are provided with deflectors having surfaces tangentially disposed with relation to the peripheries of the disks and the sides of the channels along the said deflectors are cut away in order that the transverse sectional area of the steam channels may not be reduced owing to the presence of the said deflectors.

In the accompanying drawings:—Figure 1 is a vertical longitudinal sectional view of the engine. Fig. 2 is a transverse sectional view of the same cut on the line 2—2 of Fig. 1. Fig. 3 is a transverse sectional view of the same cut on the line 3—3 of Fig. 1. Fig. 4 is a transverse sectional view of the same cut on the line 4—4 of Fig. 1. Fig. 5 is a transverse sectional view of the same cut on the line 5—5 of Fig. 1. Fig. 6 is a diagrammatic plan view illustrating the relative arrangement of the steam channels and transmission ports of the engine. Fig. 7 is an enlarged diagrammatic view of portions of the steam channels illustrating the positions of the deflectors and cut away portions at the sides of the channels and said deflectors. Fig. 8 is a diagrammatic view illustrating the course of the steam through one end portion of the engine.

The cylinder of the engine is made up of a series of rings of which the intermediate ring is indicated at 1 and the end rings at 2, 3 and 4. These rings are held together by means of bolts 5 or other suitable securing devices and the edge portions of partition members 6 are interposed between the said rings and clamped in position by the said bolts 5. The ends of the cylinder of which the said rings form component parts are closed by means of heads 7. A shaft 8 passes centrally through the heads 7 and is suitably journaled in bearings 9, the said shaft being provided at intervals along its length and within the heads 7 of the cylinder with fixed disks 10. The partition members 6 divide the interior of the cylinder into compartments and the said disks 10 are received within the said compartments.

Each of the rings 1 to 4 inclusive is provided with two approximately semi-circular channels which gradually increase in transverse sectional area from their intake ends to their exhaust ends and which are provided at intervals along their lengths with deflectors 12. The said deflectors have surfaces 13 which are tangentially disposed with relation to the peripheries of the disks 10 and the side walls of the channels 11 at the ends of the deflectors 13 are cut away as at 14 (shown best in Fig. 7 of the drawings) in order that the transverse sectional area of the steam passageway through the channels may not be diminished owing to the presence of the said deflectors therein. All of the channels 11 except those in the final rings 4 communicate at their exhaust ends with transmission ports 15 which pass through the sides of the said rings and through the edge portions of the adjacent partition members 16 and communicate with the admission ends of the channels 11 in the next adjacent rings. The channels 11 are provided at their adjacent ends with reducing nozzles 16 which are seated in the rings and which have their discharge outlets tangentially disposed with relation to the peripheries of the disks 10. The said nozzles are the elements herein referred to as the presentation elements or means inasmuch as they present or direct the steam at proper angles against the peripheries of the disks and the vanes carried thereby as will be hereinafter explained. Each of the said rings is provided with two of the nozzles 16 and the said nozzles are located at diametrically opposite sides of the disks 10, consequently the steam is presented through the said disks at diametrically opposite sides and is exhausted or permitted to pass from the channels 11 at diametrically opposite sides of the said disks. Each disk 10 is provided upon its periphery with a series of spaced vanes 17 which have surfaces against which the steam from the nozzles 16 impinge, the said surfaces being in planes parallel with the axis of the shaft 8.

The sides of the peripheral portions of the partitions 6 are recessed as at 18 and the said recesses snugly receive the end portions of the vanes 17 as illustrated in Fig. 1 of the drawings, and the said vanes are provided with shanks 19 which lie against the sides of the peripheral portions of the disks 10 and approximately close the spaces between the faces of the said disks and the faces of the adjacent partition members 6. The partition members 6 are centrally bored as at 19 and bushings 20 are inserted in the said bores and fit tight with the said disks and consequently are held in stationary positions and in steam-tight relation with the disks. The said bushings 20 are made of Babbitt or other comparatively soft metal and the intermediate portion of the shaft 8 is journaled in the said bushings. The hubs 21 of the disks 10 fit snug against the ends of the bushings 20 and project slightly within the sides of the partition members 6 as illustrated in Fig. 1. The intermediate or initial ring 1 is provided with a steam inlet passage 22 which extends down into the said ring and divides it into passages 23 which extend to the opposite sides of the said ring and communicate through the nozzles 16 with the admission ends of the steam channels 11 in the said ring. The final or end rings 4 of the cylinder are provided with exhaust passages or openings 24 which communicate with the exhaust ends of the steam channels 11 in the said rings and which may if desired lead to a condenser as illustrated in Fig. 1 of the drawings. A steam chest 25 is located at the upper end of the steam passage 22 and a cut off valve 26 is located in the said steam chest and controls the ports at the upper end of the passageway 22. A lever 27 is fulcrumed upon a suitable support and is operatively connected at one end with the stem of the cut off valve 26. The other end of the said lever is connected by means of a rod 28 with a governor 29 which is operatively connected with the shaft 8. An indicator 30 is mounted upon a suitable support and is operatively connected with the rod 29 in a manner as illustrated in Fig. 1 of the drawings.

After the steam has been admitted to the channels 11 in the initial ring 1 it passes along the said channels and operates upon the vanes of the disks located therein and when the steam arrives at the exhaust ends of the said channels it is slit into branches which branches are directed toward the opposite ends of the cylinder of which the said rings form component parts. Therefore in brief, the steam is admitted into the cylinder in a single column which is divided into two columns which are led to the opposite sides of the cylinder and directed in opposite directions at their points of presentation against the vanes and the peripheries of the disks. Therefore the steam pressure at one side of the disks is equal to the steam pressure at the opposite side thereof. After the divided columns of steam have traversed the length of the steam channels in the initial ring they are split into branches which through the channels of the succeeding rings are directed toward the ends of the cylinder. Thus the passage of the branches of the steam from the middle of the cylinder toward its ends in equal quantities will balance the rotor of which the base and disks form component parts within the cylinder and there will be no tendency to press the shaft or the parts supported thereby, longitudinally of the cylinder. Any steam which may pass between the edges of the vanes 17 and the sides of the recesses 18 in the partitions 6 into the space between the sides of the disks 10 and the sides of the said partitions will be confined between the adjacent partitions by the bushings 20 and cannot travel longitudinally of the shaft 8 without again reëntering one of the channels 11 and passing through the transmission ports 15 in the regular manner, but any steam that may enter the space between the sides of the disks 10 and the sides of the partition members 6 will be moving in the same direction as the disks but at a much more rapid rate of speed and consequently will have a tendency to accelerate the movement of the disks rather than retard the same.

In order to make clear the courses of the steam through the engine attention is directed to the diagrammatic view Fig. 8 which illustrates the course at one end and inasmuch as the course at the other end is exactly the same a description of this course will suffice for both courses. In this view the capital letters with exponents indicate the course of one branch of the steam, while the small letters and exponents indicate the course of the other branch of the steam. After the column of steam has been divided in two columns in the passageway 23 as above described the said divided columns are presented to the vanes of the initial disk 10 through the presentation nozzle as at A. The steam then follows the channel in the ring 1 through a working stage $A'$ is split at the point 31 into branches which as above described are directed toward opposite ends of the cylinder. One branch is transmitted as at $A^2$ to the presentation point B of the adjacent ring 2. The steam then passes along the second stage of work $B'$ to the transmission port 3 through which it is passed to the third ring to the point of presentation C. The branch of steam then passes along its third stage of work at $C'$ and then is transmitted at $C^2$ to the point of presentation D from which it passes to its fourth stage of work $D'$ and thence to exhaust. The other divided column of steam is presented to the vanes of the initial disk to the point of presentation $a$ and accomplishes its first work along the first stage of the course $a'$. This divided column then encounters the point 31 and is split into two branches which branches are directed toward the opposite sides of the engine as above explained. One branch follows the course $a^2$ to the point of presentation $b$ from which it is admitted to its second stage of work at $b'$ and is passed into its second transmission at $b^2$. From $b^2$ the branch of steam passes into the presentation $c$ thence along its third course of work $c'$ to a transmission $c^2$. From the said transmission the branch of steam passes into the presentation $d$ thence along the fourth stage of work $d'$ from whence it passes into the transmission $d^2$ and exhausts. Therefore it will be seen that the original column of steam is divided into branches which are equally distributed at the sides and ends of the cylinder and hold the moving parts therein in a state of counter-balance also the ever increasing transverse sectional area of the steam passages through the cylinder permit the steam to expand from its point of introduction to the cylinder to its point of exhaust to avoid back pressure at the exhaust ends of the cylinder. Also it will be seen that the columns and branches of steam are presented to the vanes in such manner that both the courses of impact and expansion of the steam is utilized and transmitted to the engine shaft and therefore the power of the steam is economically converted into mechanical movement.

Having described the invention what I claim as new and desire to secure by Letters Patent is:—

1. A rotary steam engine comprising a cylinder, a rotor journaled therein and provided with vanes, said cylinder having steam channels which open toward the vanes and which are arranged in stages connected together by transmission ports, said channels increasing in transverse sectional area from their admission ends toward their exhaust ends throughout the cylinder, the said channels being provided with deflectors having surfaces tangentially disposed with relation to the rotor and the sides of the channels about the ends of the said deflectors being cut away whereby the progressive increase in the transverse sectional area of the channels is not interrupted.

2. A rotary steam engine comprising a cylinder made up of rings and partition members, said partition members being centrally bored and dividing the interior of the cylinder into compartments, bushings of relatively soft metal fixed in the bores of the said partition members, a shaft journaled in the said bushings, disks having hubs mounted upon the said shaft and snugly fitting at their ends within the end portions of the bores of the partition members and against the sides of the said bushings, steam channels provided in the cylinder and opening toward the peripheries of the disks and vanes mounted upon the peripheries of the disks and arranged to move along the said steam channels, the said steam channels being connected by transmission ports whereby steam courses are established from the inlet to the exhaust of the cylinder about the peripheries of the said disks.

3. In a rotary engine, the combination of a casing, a shaft journaled therein, a rotor composed of a series of members gradually increasing in width from the center to the ends thereof, said rotor being mounted upon said shaft, said casing having a chamber adjacent to the periphery of each member of the rotor, a pressure fluid inlet disposed centrally of the casing, said casing being provided with a channel to receive the pressure fluid from said inlet and convey the said pressure fluid in opposed directions at diametrically opposite points of the central member of the rotor, said casing being further provided with a plurality of channels one to each member and in communication in successive pressure fluid conveying operation to permit each member to be acted upon successively, the last or outer chambers of the casing being provided each with an exhaust.

In testimony that I claim the foregoing as my own, I have hereto affixed my signature in the presence of two witnesses.

DELEVAN P. UPSON.

Witnesses:
FRANK B. OCHSENREITER,
M. F. MARTIN.

---

Copies of this patent may be obtained for five cents each, by addressing the "Commissioner of Patents, Washington, D. C."